United States Patent
Lalancette et al.

(10) Patent No.: US 9,206,491 B2
(45) Date of Patent: Dec. 8, 2015

(54) METHOD AND SYSTEM FOR GOLD RECOVERY

(71) Applicant: Nichromet Extraction Inc., Montreal (CA)

(72) Inventors: Jean-Marc Lalancette, Sherbrooke (CA); Bertrand Dubreuil, Trois-Rivières (CA); David Lemieux, Thetford Mines (CA)

(73) Assignee: Dundee, Technologies Durables Inc. (CA)

( * ) Notice: Subject to any disclaimer, the term of this patent is extended or adjusted under 35 U.S.C. 154(b) by 73 days.

(21) Appl. No.: 13/957,002

(22) Filed: Aug. 1, 2013

(65) Prior Publication Data

US 2015/0033913 A1    Feb. 5, 2015

(30) Foreign Application Priority Data

Jul. 18, 2013    (CA) .................................... 2821467

(51) Int. Cl.
*C22B 3/44* (2006.01)
*C22B 3/22* (2006.01)
*C22B 3/00* (2006.01)
*C22B 3/04* (2006.01)

(52) U.S. Cl.
CPC ................. *C22B 11/04* (2013.01); *C22B 3/045* (2013.01); *C22B 3/22* (2013.01); *C22B 3/44* (2013.01)

(58) Field of Classification Search
CPC .............. C22B 3/44; C22B 3/22; C22B 3/045
See application file for complete search history.

(56) References Cited

U.S. PATENT DOCUMENTS

| | | | | |
|---|---|---|---|---|
| 3,545,964 | A * | 12/1970 | Hansen et al. | 423/38 |
| 5,134,039 | A | 7/1992 | Alexander et al. | |
| 5,198,021 | A | 3/1993 | Virnig | |
| 5,215,575 | A | 6/1993 | Butler | |
| 5,785,736 | A | 7/1998 | Thomas et al. | |
| 5,885,327 | A | 3/1999 | Virnig | |
| 5,961,833 | A | 10/1999 | Green et al. | |
| 6,344,068 | B1 | 2/2002 | Fleming et al. | |
| 6,451,088 | B1 * | 9/2002 | Marsden et al. | 75/739 |
| 7,067,062 | B2 | 6/2006 | Yang et al. | |
| 7,537,741 | B2 | 5/2009 | Lalancette | |
| 2002/0152845 | A1 * | 10/2002 | Fleming et al. | 75/732 |

FOREIGN PATENT DOCUMENTS

| | | |
|---|---|---|
| BR | PI9302182 A | 11/1993 |
| CA | 553399 | 2/1958 |
| CN | 102002600 A | 4/2011 |
| CN | 2012-218991 A | 11/2012 |
| CN | 102409171 B | 5/2013 |
| GB | 2282823 | 4/1995 |
| WO | WO-99/45158 A1 | 9/1999 |
| WO | WO-02/077302 A1 | 10/2002 |
| WO | WO-2007/074360 A2 | 7/2007 |

OTHER PUBLICATIONS

The Foseco Foundryman's Handbook, Brown, John R (ed). 10th Revision. 1994. pp. 27 and 28.*
Eisele, J. A. et al "Gold Transport by Complex Metal Chloride Vapors", Report of Investigations 7489, Bureau of Mines, United States Department of Interior, 1971. p. 1.*
"International Application No. PCT/CA2013/050558, International Search Report and Written Opinion mailed Apr. 7, 2014", 10 pgs.
Tertykh, V. A, et al., "The Reduction of Gold Nanoparticles in the Surface Layer of Modified Silica", Russian Journal of Physical Chemistry A., 2008, vol. 82, No. 9, pp. 1438-1441, (2008), 1438-1441.
Eisele, J. A., et al., "Gold Transport by Complex Metal Chloride Vapors", Report of Investigations 7489, Bureau of Mines, United States Department of Interior, 1-12, 1971.
Marsden, J. O., et al., *In: The Chemistry of Gold Extraction*, (Second Edition), Society of Mining, Metallurgy, and Exploration, Inc., (2006), p. 423.
Marsden, J. O., et al., *In: The Chemistry of Gold Extraction*, (Second Edition), Society of Mining, Metallurgy, and Exploration, Inc., (2006), p. 413.
Marsden, J. O., et al., *In: The Chemistry of Gold Extraction*, (Second Edition), Society of Mining, Metallurgy, and Exploration, Inc., (2006), 271-275.
Mohammadnejad. S., et al., "Reduction of gold(III) chloride to gold(0) on silicate surfaces", *Journal of Colloid and Interface Science*, 389(1), (2013), 252-259.
Paclainski, K., et al., "Kinetics of Gold(III) Chloride Complex Reduction Using Sulfer(IV)", *Metallurgical and Materials Transactions B, vol. 35B*, (Dec. 2004), 1071-1085.

* cited by examiner

*Primary Examiner* — George Wyszomierski
*Assistant Examiner* — Tima M McGuthry Banks
(74) *Attorney, Agent, or Firm* — Schwegman Lundberg & Woessner, P.A.

(57) ABSTRACT

A method for recovering precious metal from an acidic pregnant solution resulting from halogen or hypohalite leaching of an ore, comprising lowering the ORP of the pregnant leachate with a reducing agent in the presence of slurried non-carboneous particles. The precious metal deposits on the surfaces of the particles and a barren solution comprising substantially all the halogen values of the pregnant solution in the form of sodium chloride, sodium bromide or hypohalites is recovered.

9 Claims, No Drawings

METHOD AND SYSTEM FOR GOLD RECOVERY

CLAIM OF PRIORITY

This application claims the benefit of priority of Canadian Application Serial No. CA 2821467, entitled "METHOD FOR GOLD RECOVERY ON PARTICLES," filed on Jul. 18, 2013, the benefit of priority of which is claimed hereby, and which is incorporated by reference in its entirety. This application is related to International Application No. PCT/CA2013/050558, filed on Jul. 18, 2013.

FIELD OF THE INVENTION

The present invention relates to recovery of gold. More specifically, the present invention is concerned with a method or a system for the recovery of gold and other precious metals from a pregnant solution generated by the action of halogens or halogen derivatives on a precious metals-bearing ore, while facilitating the recycling of halogens or halogen derivatives from the resulting barren solution.

BACKGROUND OF THE INVENTION

The use of halogens for the recovery of precious metals has been reported by several authors as an alternate option to cyanide extraction of gold and silver (The Chemistry of Gold Extraction, Second Edition by John O. Marsden and C. Ian House, Society of Mining, Metallurgy, and Exploration, Inc., 2006, pp. 271-275). In these processes, the precious metals are present, after leaching in the pregnant solution, as complexed halides, such as $AuCl_4^-$ or $AgBr_2^-$. It has been reported that as long as the oxidation-reduction potential (ORP) is maintained at appropriate values, in the range of 800 mV (AgCl/Ag reference), these pregnant solutions under acidic conditions are quite stable.

The recovery of precious metals can be done by contacting these pregnant solutions with activated carbons. These carbons, with specific surfaces as high as 500 to 1000 $m^2/g$, are very efficient at retaining gold and silver and leave a truly barren solution. However, in the case of metal leaching with halogens, particularly with bromine, the halogens tend to form stable halogenated compounds with carbon, thus precluding complete recycling of halogens and creating a disposal problem of halogenated carbon. Under these circumstances, in the course of the development of a new approach for precious metals extraction with halogens as described for example in U.S. Pat. No. 7,537,741, it has been found desirable to find an alternate approach to the classical adsorption of gold on carbon as practiced with the cyanide leaching.

Precipitation of gold on an inert solid from a gold solution is well-known because of the highly hydrophobic nature of this metal (Ibid., p. 413). Gold precipitated over silica is known, as reported by J. A. Eisele et al, U.S. Bureau of Mines, Report of Investigation 7489.

SUMMARY OF THE INVENTION

More specifically, in accordance with the present invention, there is provided a method for recovering precious metals from an acidic pregnant solution resulting from halogen or hypohalite leaching of an ore, comprising lowering the ORP of the pregnant leachate with a reducing agent in the presence of slurried non-carboneous particules.

There is further provided a method for recovering gold from a gold and copper-bearing acidic pregnant solution resulting from the leaching of an ore with oxidizing hypohalite, contacting, at ambient temperature and pressure, a first pregnant solution with non-carboneous particles having a specific surface in a range between about 0.01 and about 10 $m^2/g$, reducing an initial ORP of the pregnant solution to a range between about between 500 and about 0 mV by $SO_2$ circulation in the pregnant solution, stirring, and separating the non-carboneous particles with gold deposited on surfaces thereof from a barren solution containing halogen as NaCl, NaBr and residual hypohalites, along with copper salts.

Other objects, advantages and features of the present invention will become more apparent upon reading of the following non-restrictive description of specific embodiments thereof, given by way of example only.

DESCRIPTION OF EMBODIMENTS OF THE INVENTION

In the course of the evaluation of the stability of pregnant solutions resulting from the leaching of gold/silver ores with hypohalites, a decreasing stability of these solutions was noted as the ORP was reduced, from leaching values, from between about 1100 mV and about 500 mV, under acidic conditions, i.e. at a pH in a range between about 0.1 and about 2.5, to values approaching a few hundred millivolts, i.e. in a range between about between 500 and about 0 mV.

It had been reported by Paclawski et al (Metallurgical and Materials Transaction B, 35B December 2004, p. 1071-85) that gold as gold chloride could not be precipitated by decrease of the ORP ($Na_2SO_3$) unless the concentration of gold was above $10^{-3}$ M, or 200 mg/l. Surprisingly, it was shown that if the decrease of the ORP is achieved in the presence of particles, gold at concentration below 200 mg/l is precipitated quantitatively, and that there is a distribution of the precipitated gold in direct proportion to the area of available surfaces exposed to the solution where the gold is precipitating. If the ORP decrease is done in a flask, all the gold precipitates on the surface of the flask. When this precipitation is made in the presence of a given weight of a finely divided solid, such as silica, for example, slurried in the pregnant solution, the distribution of the precipitated gold was found to be the same as the ratio of the surface of the container versus the surface of the divided solid. As an example, if the ORP of a pregnant solution is reduced from 850 mV to 200 mV in the presence of 25 g of fine silica with a specific surface (BET) of 1.0 $m^2/g$ in a flask with a surface of 0.01 $m^2$, the gold is found at 99.96% on the silica and 0.04% on the surface of the flask.

It had been noted that the various salts present in the pregnant solution, such as NaCl, NaBr, sodium hypochlorite and sodium hypobromite, had a tendency to react with the activated carbon to give undesirable halogenated carbon derivatives. In the case of precipitation on particulates, the halogens were recovered as corresponding sodium halides or hypohalides after the decrease of the ORP, on a quantitative basis.

The solid particles suspended in the pregnant solution can be silica, insoluble aluminosilicates, recycled glass or recycled slag. The solid particles should be insoluble and of a small particle size, typically a fine particle showing a surface of the order of 1 $m^2/g$. The use of recycled glass or slag simplifies the recovery of gold at the melting stage. Metallic particulates or surfaces, except for already recovered precious metals, are not used, because of potential interferences by cementation or alloy formation.

The surface of the particles is selected in a range between about 0.01 and about 10.0 $m^2/g$ so as to give a high surface ratio when related to the surface of the reactor (flask). A surface of the order of 1 m²/g corresponding to particles of the order of 10 microns in diameter is appropriate in most instances.

The agents that can be used to reduce the ORP from around 500-1000 mV are numerous and can be selected so as to be adapted to the recycling of the barren solution, after precious metals recovery. Sulfur dioxide ($SO_2$) available from the oxidation of the sulfide ores has been found very efficient. Sodium sulfite ($Na_2SO_3$) added as a solid or a solution has also been used successfully. Organic reducers, such as formic acid, formaldehyde or oxalic, have the advantage of leaving no residues in the barren solution, the carbon evolving as $CO_2$ as shown by J. A. Eisele et al, (cited above).

The metal deposition is not an instantaneous process, as the ORP is reduced, a period of 30 to 60 minutes being required to achieve total deposition of gold on the particles. With stirring in order to have a homogenous dispersion of particles, and operating at room temperature and atmospheric pressure, the gold recovery is complete after one hour. The gold-loaded particles can be separated from the barren solution by filtration or centrifugation and used with a fresh load of pregnant solution until the gold accumulated on the particles reach the desired level, which can be as high as 30% of the weight of the particles.

If there are common metals, such as Fe, Cu, Zn for example, in the pregnant solution, under acidic conditions at pH lower than 1.5 and with an appropriate reducer, it is possible to prevent the precipitation of these base metals along with the precious metals. After gold/silver collection on the particles, the common metals can be collected from the barren solution by known methods.

In a first experiment, a pregnant solution (250 ml) containing 1000 mg/l of Au, 32.32 g/l of chlorides, 1.66 g/l of bromides and 46.08 g/l of sulfates and having a pH of 0.8 was stirred in a 500 ml three necks flask at atmospheric pressure and ambient temperature (23° C.) with 25 g of silica (Ottawa sand) previously ground to a median size of 16 microns and having a surface of 1.108 m²/g. The initial ORP of the slurry was 949 mV. A stream of $SO_2$ gas was then circulated in the slurry. After 10 minutes a dark grey precipitate had formed over the silica and the ORP had decreased to 467 mV. The reaction was terminated after 60 minutes, the ORP being then at 299 mV.

The silica/precipitate was then filtered, rinsed with water and digested with aqua regia in order to collect the gold deposited over the silica. The gold thus dissolved represented 99.98% of the gold content in the initial pregnant solution. By rinsing the three necks 500 ml flask with aqua regia after the filtration of the silica/precipitate, it was found that 0.08% of the initial gold had been deposited and retained on the walls of the flask.

In a second experiment, a 250 ml aliquot of an acidic solution (pH 0.8) containing 95.5 mg/l of gold was reduced as described in the previous experiment with $SO_2$, from an ORP of 938 mV to 276 mV over one hour, in the presence of 10.0 g of slurried silica. The filtered silica was then fused after mixing with three times its weight of dry sodium borate. The resulting gold bead, having a weight of 0.238 g, represented 99.7% of the starting amount of gold.

An experiment similar to the second experiment described hereinabove was repeated except that the reducer was a ten percent solution of sodium sulfite in water. The weight of the gold bead represented 99.8% of the initial gold in the starting pregnant solution.

In another experiment, in a glass-lined reactor having a 400 l capacity, a 215 l sample of a pregnant solution obtained by chlorination of a gold-bearing ore was introduced along with 1.50 kg of silica. The chlorination had been done with a 2.5% hypochlorite/hypobromite solution in a NaCl/NaBr brine under acidic conditions. The pregnant solution had a gold content of 4.46 g/t and the ORP was 1000.6 mV at a pH of 1.04. The silica had a median particle size of 16 microns with a surface of 1.10 m²/g.

The resulting slurry was stirred at atmospheric pressure and ambient temperature while sulfur dioxide was sparged in the slurry. After one hour, 1.5 kg of $SO_2$ had been circulated in the reactor and the ORP of the slurry was 455 mV. Sampling of the slurry after one hour of treatment indicated that essentially all the gold had been precipitated (0.02 g Au/l in the barren solution).

The slurry was filtrated and the recovered silica (1.45 kg) was digested in aqua regia in order to recover the precipitated gold. The analysis of the aqua regia solution indicated that 99% of the precipitated gold was found on silica. It was also noted that the total halogen content of the system (pregnant or barren solutions) remained constant at 2600 mg/kg of $Cl^-$ and 900 mg/kg of $Br^-$.

In a fifth experiment, starting with a pregnant solution obtained from gold extraction with hypohalites, gold was deposited over silica by lowering the ORP by sodium sulfite addition. The pregnant solution contained 9.26 g/t Au, with 8.5% sodium chloride and 0.75% sodium bromide, and was showing an ORP of 0.911 volts.

An aliquot of one liter of the pregnant solution was contacted with 5.0618 g of silica of 1.1 m²/g (BET) with stirring at room temperature while the ORP was reduced by addition of sodium sulfite (7-10 g) to a value of 0.400 volt. The slurry was then submitted to a phase separation by centrifugation and the barren solution analyzed. It was noted that the gold content was below detection while the sodium chloride and sodium bromide contents were not changed by contacting with silica.

Such a contacting of one liter of fresh aliquot of pregnant solution was repeated 40 times on the same 5.0618 g sample of silica in order to evaluate the efficiency of gold deposition as gold accumulates over silica. It was noted that in each test, the solution was barren of gold after ORP lowering and the NaCl/NaBr content was not affected.

After these 40 cumulative tests, the silica was rinsed with 2% nitric acid and the dried material was melted, using 17.0 g of sodium borax as flux. A clean glass was obtained and liberated of gold bead, weight 0.330 g Au. From the barren solutions observed in each test the collection of gold was essentially complete. In spite of unavoidable handling losses of silica in each test, the expected recovery of 0.370 g of gold was reached at the level of 89%. Therefore, the particles loaded with a first gold deposit could be used to collect gold from other lots of pregnant solution until the accumulated gold on particulates represented up to about 30% of the weight of the particles.

In a sixth experiment, 500 ml of gold containing 1.58 g Au at a pH of 0.75 and an ORP of 916 mV and with a salt concentration of 31.5 WI of chloride and 1.90 WI of bromide was contacted with 5.0 g of silica with a specific surface of 1.1 m²/g. The solution was sparged with $SO_2$ as described in Experiment 1 described above. The final ORP was 285 mV at a pH of 0.50. Aqua regia leaching of the deposited gold on silica and on the one liter reaction flask indicated 99.99% deposition on silica and 0.01% on the wall of the flask. The weight of deposited gold, 1.56 g, corresponds to 31% of the weight of silica. The concentration of the chloride and bromide ions had not been changed in the barren solution, after gold collection.

In a seventh experiment similar to experiment 2 described above except that the solid particules used were ground recycled glass with a specific surface of 1.1 m$^2$/g, the gold recovery on this material, at a final ORP of 280 mV was 99.99%.

As people in the art will now be in a position to appreciate, the present invention allows the quantitative collection of gold or silver from a pregnant solution by deposition on a non-metallic and non-carboneous surface. In the case of halogens extraction involving bromine, the present invention allows recycling the bromine element involved in the extraction, for sake of economy and environmental protection.

The scope of the claims should not be limited by the embodiments set forth in the examples, but should be given the broadest interpretation consistent with the description as a whole.

What is claimed is:

1. A method for recovering precious metals from a precious metals-bearing ore, comprising:
    leaching the ore using a hypochlorite/hypobromite solution at atmospheric pressure, thereby yielding a precious metals-bearing halogen-based pregnant solution; and
    lowering an oxidation-reduction potential of the pregnant solution with a reducing agent while contacting the pregnant solution with slurried non-carboneous particles having a specific surface in a range between about 0.01 and about 10 m$^2$/g, at ambient temperature and pressure, and at a pH in a range between about 0.1 and about 2.5, yielding a barren solution comprising substantially all the halogen values of the pregnant solution.

2. The method of claim 1, comprising lowering the oxidation-reduction potential of the pregnant solution from a range between about 1100 mV and about 500 mV AgCl/Ag reference to a range between about between 500 and about 0 mV AgCl/Ag reference.

3. The method of claim 1, wherein the reducing agent is one of: SO$_2$, a water-soluble sulfite, a water-soluble organic aldehyde and a water-soluble organic acid.

4. The method of claim 1, wherein the slurried non-carboneous particles are one of: silica, aluminosilicate, recycled glass or recycled slag.

5. The method of claim 1, wherein the pregnant solution contains gold and salts.

6. The method of claim 1, wherein the halogen values of the pregnant solution is recovered in the form of sodium chloride, sodium bromide or hypohalites.

7. A method for recovering gold from a gold and copper-bearing ore, comprising:
    leaching the ore with a hypochlorite/hypobromite solution at atmospheric pressure, yielding a first gold and copper-bearing pregnant solution;
    contacting, at ambient temperature and pressure and at a pH in a range between about 0.1 and about 2.5, the first pregnant solution with non-carboneous particles having a specific surface in a range between about 0.01 and about 10 m$^2$/g;
    reducing an initial oxidation-reduction potential of the first pregnant solution to a range between about between 500 and about 0 mV AgCl/Ag reference by SO$_2$ circulation in the first pregnant solution; and
    stirring, and separating the non-carboneous particles with gold deposited on surfaces thereof from a barren solution containing halogen as NaCl, NaBr and residual hypohalites, along with copper salts.

8. The method of claim 7, comprising contacting the non-carboneous particles with gold from the first pregnant solution deposited on surfaces thereof in a second gold- and copper bearing pregnant solution, reducing an initial oxidation-reduction potential of the second pregnant solution to a range between about between 500 and about 0 mV AgCl/Ag reference by SO$_2$ circulation in the second pregnant solution, stirring, and separating the non-carboneous particles with gold deposited on surfaces thereof from a resulting barren solution containing halogen as NaCl, NaBr and residual hypohalites, along with copper salts.

9. The method of claim 7, comprising retrieving the non-carboneous particles with gold deposited on the surfaces thereof from the resulting barren solution and using them for collecting gold in a gold and copper-bearing pregnant solution until an amount of gold accumulated on the particles represents up to 30% of the weight of the particles.

* * * * *